United States Patent Office 3,184,423
Patented May 18, 1965

3,184,423
PROCESS FOR THE MANUFACTURE OF POLY-
CONDENSATION PRODUCTS FROM UREIDO-
CARBOXYLIC ACID ESTERS
Paul Schlack, Leitershofen, near Augsburg, Germany,
assignor to Farbwerke Hoechst Aktiengesellschaft
vormals Meister Lucius & Brüning, Frankfurt am Main,
Germany, a corporation of Germany
No Drawing. Filed July 26, 1960, Ser. No. 45,273
Claims priority, application Germany, Aug. 1, 1959,
F 29,079
14 Claims. (Cl. 260—21)

The present invention relates to a process for the manufacture of polycondensation products from ureido-carboxylic acid esters, wherein polyvalent ureido-carboxylic acid esters containing a terminal primary amino group which derive from esters of higher fatty acids or hydroxyfatty acids containing hydroxyl groups and which, on the average, contain in the molecule at least two alcoholic hydroxyl groups bound to carbon atoms containing hydrogen, are caused to react with aldehydes or aldehyde derivatives reactive with respect to urea groups, epsecially in the presence of an acid and by heating if desired, until a considerable molecule enlargement has taken place. The reaction with the aldehydes or aldehyde derivatives can be executed in one or, in the case of formaldehyde, in two stages. In the latter case, soluble preliminary condensates, that is methylol compounds, are first obtained which, are subjected to further condensation at a higher temperature and/or by reducing the pH-value.

The ester-like parent materials used in the process of the present invention, which must at least twice be esterified in the molecule with an ureido-carboxylic acid having a terminal free amino group are readily available and accessible. In the following, a number of those esters containing several hydroxyl groups are enumerated by way of example:

10-oxystearic acid-oxyethyl-ester; 10 oxystearic acid-monoglyceride; di-10-oxystearic acid-ethylene-glycol-ester; ricinoleic acid-oxyethylester; ricinoleic acid reacted with 6 mols ethylene oxide; di-ricinoleic acid-ethylene-glycol-ester; castor oil; condensation products obtained from castor oil with a deficiency of bivalent acylating agents, e.g. dicarboxylic acids, such as pimelic acid, sebacic acid or hydrogenated dimerized oleic acid; dicarboxylic acid halides, such as adipic acid, a mixture of iso-sebacic acid chlorides; terephthaloyl chloride; iso-phthaloyl fluoride; 5-tert.-butyl-isophthaloyl chloride; polyvalent isocyanates, such as 1.6-hexane-di-isocyanate, 1.3-phenylene-di-isocyanate, that is, the product obtained by reacting 1 mole of trimethylolpropane and 3 mols of 1.6-hexane-di-isocyanate. In this last-mentioned reaction castor oil and polyvalent acylating agents are used in a ratio such that not cross-liked soluble products are obtained. Furthermore, castor oil which, partially, has been reacted with glycols, dicarboxylic acids and monobasic fatty acids free of hydroxyl groups, such as lauric acid, palmitic acid or oleic acid; the condensation products obtained by reacting the potassium salt of ricinoleic acid with 1.3-glycerol-di-chlorhydrin or 1.6-manitol-di-chlorhydrin; oxalkylation products obtained by reacting castor oil with ethylene oxide or 1.2-propylene oxide; condensation products containing, on the average, at least two hydroxyl groups per molecule obtained by reacting saturated or unsaturated higher fatty acids with penta-erythritol; di-penta-erythritol; celluloses partially esterified with higher fatty acids, such as nonylic acid, lauric acid or palmitic acid; polyglycide and polyallyl alcohol partially esterified with higher fatty acids; hydrogenated castor oil; hydrogenated castor oil which has been reacted with polyvalent acylating agents, e.g. dicarboxylic acids in the ratio of 1:2 or 2:3 mols; unsaturated fatty oils, such as peanut oil or olive oil, which have been oxidized and thus hydroxylated by blowing with oxygen or oxygen-containing gases; unsaturated fatty oils hydroxylated with hydrogen peroxide in the presence of formic acid; mixed condensation products obtained by reacting ricinoleic acid or oxystearic acid with at least diprimary polyhydric alcohols and dicarboxylic acids, such as azelaic acid or the mixture of branched $C_{19}$-dicarboxylic acids obtainable by oxosynthesis. Higher fatty acid esters in accordance with the invention are generally ester-like condensation products containing radicals of mono-basic carboxylic acids or oxycarboxylic acids besides dicarboxylic acids, with a terminal hydrocarbon radical having a chain of at least eight hydrocarbon atoms.

Such repeatedly hydroxylated esters of higher fatty acids may have been esterified with any desired ureido-carboxylic acid having a terminal primary amino group, e.g. with ureido acetic acid, $\alpha$-ureido-propionic acid, $\beta$-ureido-butyric acid, $\beta$-methyl-$\beta$-ureido-butyric acid, $\beta$-methyl-$\beta$-ureidocaproic acid, $\delta$-ureido-valeric acid, N-methyl-N-carbaminyl-$\delta$-amino-valeric acid, $\epsilon$-ureido-caproic acid, $\eta$-ureido-octaic acid, 4-ureido-benzoic acid, 4-[ureido-methyl]-benzoic acid. Preferably, relatively easily accessible $\beta$-ureido carboxylic acid esters are used which are more stable with respect to the derivatives of $\alpha$-amino acids and especially more resistant to hydrolysis. Those $\beta$-ureido-carboxylic acid esters which contain an ureido group bound to a tertiary carbon atom are preferred because of their stability to oxidation. The ureido esters can be prepared e.g. by reacting the fatty acid esters containing hydroxyl groups with salts of aminocarboxylic acid halides, followed by carbamination.

For the reaction with such polyvalent ureido-carboxylic acid esters there may generally be used aldehydes and aldehyde derivatives reacting with urea, especially formaldehyde and reactive derivatives thereof. There may be mentioned more especially: formaldehyde and its depolymerizable polymers, such as paraformaldehyde or trioxan and reactive derivatives, such as halogen-methyl-ether, methylol compounds of amide-like substances and, especially, the ethers of methylol compounds with alcohols and glycols of low molecular weight. There may be mentioned by way of example: dimethylol urea-dimethylether; dimethylol urea-dibutylether; tetramethylol acetylene diureic tetramethylether; bis-methylol compounds of guanamines with higher fatty radicals on the carbon atom; 1.3-dimethylol - 4.5 - dioxy - imidazolidone - 2; polymethylolmelamine; polymethylolmelamine-alkylether and -$\beta$-oxyethylether; N,N'-dimethylolpimelic acid-diamide the dimethylol compound of the amide mixture of commercial "isosebacic acid," soluble polymethylol compounds of linear polyamides, especially copolyamides and their alkyl ethers, e.g. the polymethylol compound obtained from poly-$\alpha$-pyrrolidone and its methylether; the polymethylol compounds obtained from the copolyamide, prepared from 60 parts of adipic acid hexamethylendiamine and 40 parts of caprolactam; methylether of the polymethylol compounds of polycaprolactam; methylol compounds of bis-carbamide acid esters of di- and polyvalent hydroxyl compounds, e.g. of butanediol-1.4, diethylene glycol, $\beta$-methyl-hexamethylene glycol, hexanetriol-1.3.5, trimethylol propane; the bis-methylol compound of the bis-carbamide acid ester of N-dodecyl-N-diethanol amine. Further aldehydes and derivatives thereof which may be used for the process of this invention are: chloro-dimethyl-ether; $\alpha,\alpha'$-dichloro-dimethylether, hexamethylene-glycol-bis-chloro-methylether and thermally decomposable onium compounds of mono- or polyvalent chloro-methylether, furthermore, acetaldehyde and reactive derivatives, such as $\alpha$-halogeno-ethylether, acrolein, $\alpha$-chloro-acrolein, methacrolein, glyoxal, $\alpha,\beta$-dichloro-dioxan, methylglyoxal, adipic dialdehyde, terephthalic dialdehyde, trimesic-trialdehyde. Those aromatic dialdehydes which contain formyl groups in p-position are especially reactive.

The optimum amount of carbonyl compound to be used can be determined by a simple test. When not volatile aldehydes are used, it is advantageous to employ one to two reactive carbonyl groups per ureido group. With readily volatile aldehydes or compounds which split off volatile aldehydes in the heat, greater excesses can be used. For the execution of the reaction in two stages, it is advantageous to operate with a considerable excess of carbonyl compounds, especially formaldehyde, and to carry out condensation in an alkaline medium. In most cases, it is essential for the smooth course of reaction that the reaction partners are at least partially used in the homogeneous phase. Inasmuch as no highly reactive materials, for example formaldehyde, are used, it is advantageous to choose aldehydes or aldehyde derivatives of organophilic character which are either miscible with the ureides or soluble in common solvents, such as alcohols, esters, ethers or chlorinated hydrocarbons. Substances which are water-soluble but are insoluble or insufficiently soluble in alcohols, generally give a satisfactory reaction only with relatively hydrophilic ureido esters.

In many cases, the reactions which lead to linear or cross-linked high molecular weight polycondensation products take already place at room temperature, especially in the presence of catalytic amounts of acids. Generally, especially when reactions on substrata are concerned (e.g. textiles, wood, paper, leather) it is preferable to carry out the condensation only under the influence of a higher temperature. In such cases, it is advisable not to add acid at the beginning of the reaction, e.g. phosphoric acid, toluene-sulfonic acid, camphorsulfonic acid, but to use agents yielding acid, which, in the heat, gradually set free the acid necessary for the acceleration of the reaction. For this purpose, the acid-yielding agents usually used in the aminoplast chemistry, e.g. ammonium salts, zinc chloride, chloroacetamide, tartaric dialkylester, oxalic acid- and oxamidic acid alkyl esters, toluene sulfonic acid methylester, toluene-sulfonic acid-oxyethyl-ester, phthalic anhydride, phthalic imide may be used. When the aldehyde derivative used splits off acid itself, as it is the case with the $\alpha$-halogeno-alkylethers, or the analogous $\alpha$-halogeno-alkyl-amides, a special addition of acids or agents yielding acids is no longer necessary.

The reaction of the ureidoesters with the carbonyl compounds and their reactive analogues, especially the N-methylol compounds, their ethers or esters, can be carried out in a homogeneous mixture or in solution, occasionally in dispersion, as stated above. When the reaction is carried out in solution there may advantageously be used alcoholic solvents e.g. methanol, ethanol, isopropanol, glycol-mono-methylether, glycol-mono-ethylether, glycol-mono-acetate, ethylene chlorhydrin, tetrahydrofurfuralcohol; hexane-triol-monoformal, esters, such as methylacetate, ethylacetate-ethers such as diethylethers and dioxan; chlorinated hydrocarbons such as methylene chloride, chloroform and ethylene chloride, the last-mentioned compounds especially in admixture with alcohols. In the case of easily soluble aldehydes or aldehyde derivatives there may also be used simple hydrocarbons, such as toluene or cyclohexane. The condensations generally proceed very smoothly, so that low temperatures (below 110° C.) can usually be used which is especially advantageous for the preferred reactions on sensitive substrata, such as flat textile structures, paper or leather. The polycondensation processes may, of course, also be carried out in the presence of effect-producing substances, such as dyestuffs or pigments, e.g. in printing pastes, furthermore in the presence of filling and reinforcing agants, e.g. in the presence of natural or synthetic fibers or of elastifying substances, such as cork powder or artificial urethane sponge powder.

So far as the end products contain active double bonds, they may be subjected to oxidative after-drying, especially when siccatives, for example lead-manganese resinate or cobalt-naphthenate have been added. A slight adhesion of the end products can be avoided by using mixtures of different starting materials, e.g. combinations of ureido-carboxylic acid esters of hardened castor oil and of ureido-carboxylic acid esters obtained from castor oil in variable mixing proportions. Undesirable oxidative alterations may be avoided by using antioxidizing agents.

The process can be used in many fields of application. The polycondenstates obtained by this invention can generally be used as adhesives and binding agents and as surface finishing agents for textile fabrics, paper, leather or artificial leather. Self-supporting films can also be produced by the process of the present invention.

As adhesives, the polycondenstates of the invention are used in statu nascendi, for instance for bonding wood, wood fiber material, paper, leather, fibers or fabrics, alone or in admixture with any other two-dimensional or fibrous materials. Furthermore, they can be used as binding agents for fiber fleeces, mats, roves made from any fibers, for example cotton fibers, wood fibers, fibers made of cottonized natural cellulose fibers; furthermore for textile structures made of or with animal fibers, such as wool, synthetic fibers, such as polyamide fibers, polyester fibers, polyacrylonitrile fibers, fibers made of polyolefines and polyhalogeno-olefines and, finally, glass fibers, especially those whose surface has been rendered lypophilic.

Finally, the process of the invention can be used for the insulation and tightening of porous materials, e.g. of burned clay, stonework, wood.

The following examples serve to illustrate the invention, but they are not intended to limit it thereto:

Example 1

The molar quantity of hydrogen chloride calculated on lactam was introduced at room temperature into a mixture prepared from 18.6 parts of castor oil and 5.94 parts of $\beta$-methyl-$\beta$-butyrolactam. The batch was allowed to stand over night. After that time, the hydrochloric acid ester of castor oil with $\beta$-methyl-$\beta$-aminobutyric acid had formed. The product, a soapy substance, contained 3.14% of nitrogen.

To a 5% aqueous solution of the ester salt the equimolar quantity of potassium cyanate, calculated on nitrogen, in concentrated aqueous solution was added at room temperature. In this reaction, the urea separated as an oily layer. To complete the reaction, the mixture was stirred for a further two hours at 50° C. Then, the ureido ester was taken up in methylene chloride. After the evaporation of the solvent, the ureido ester remained behind as a viscous, practically colorless oil with a nitrogen content of 4.73%. The ureido ester was dissolved in three times the quantity of acetone. Then, per g.-atom of nitrogen one equivalent of formaldehyde in the form of a 40% aqueous solution and 2% of phosphoric acid of 85% strength, calculated on the ureido ester, were added. The liquid became turbid and was immediately poured on to glass plates. After evaporation of the solvent and after the mixture had been allowed to stand overnight, an elastic, still slightly adhesive oil film, clear as water, was obtained which could be detached from the support without damage.

A similar film was formed by adding ½ equivalent of formaldehyde. In this case, the film was more adhesive, but hardened by heating it to 120° C. for 30 minutes.

Example 2

By heating castor oil with the quantity of $\epsilon$-amino-caproic acid chloride-hydrochloride, equivalent to the hydroxyl-groups, in boiling toluene, the hydrochloric acid salt of the amino ester was obtained. This ester salt was taken up in water while gently heating and the resulting solution was mixed with a concentrated solution of potassium cyanate (excess of 20%, calculated on the nitrogen content of the ester salt). The tris-ureido-carboxylic acid ester separated immediately and was taken up in methylene chloride in order to separate the salts. The viscous oily ureide which remained, after the solvent had been expelled, was then dissolved in 3 parts of 80% alcohol and then mixed with one mol of formaldehyde in a 40% aqueous solution, calculated on two g.-atoms of nitrogen. After having added a catalytic quantity of phosphoric acid, the product was poured on to a plane surface.

After drying at room temperature an elastic, but still slightly adhesive film was obtained.

*Example 3*

The experiment was carried out as described in Example 1 with the exception, however, that the castor oil was replaced by a condensation product of two mols of castor oil and one mol of commercial "isosebacic acid." A similar film as obtained in Example 1 was formed.

*Example 4*

One part of ureido ester (nitrogen content 5.3%) prepared as described in Example 1, but with a 20% excess of potassium cyanate, was dissolved while adding a catalytic amount of trimethylamine-hydrochloride (3% calculated on the ureido ester), in three parts of alcohol together with one part of the copolyamide which had been prepared from 60 parts of adipic acid hexamethylene-diamine and 40 parts of caprolactam and which had been reacted with formaldehyde and transformed into a polymethylol compound. The resulting solution was poured on to glass plates. After drying to a slight extent at room temperature, the castor oil-modified film of polyamide was heated to 130° C. for 30 minutes. The after-hardened film which was still soft could then easily and without damage be detached from the support. It showed good strength and elasticity and was insoluble in all customary organic solvents.

*Example 5*

Three mols of castor oil (calculated as ricinoleic acid-triglyceride) and one mol of m-toluylene-di-isocyanate were heated to 130° C. for 4 hours. With the increase of the viscosity a polycondensate with 3.85% of hydroxyl was formed. After diluting the viscous oil with one part by volume of dioxan, the quantity of β-methyl-β-butyrolactam, equivalent to the hydroxyl content was added and, at room temperature (about 25° C.) the quantity of hydrogen chloride equimolar to the lactam was introduced. The batch was allowed to stand overnight. Then, the solvent was separated under reduced pressure and the residue was taken up in four parts by volume of methanol/water (1:1). The solution was heated to 50° C., and a saturated solution of potassium cyanate (excess of 50%) compared with the quantity calculated on lactam) was added dropwise while stirring. The polyureide precipitated immediately. The reaction mixture was allowed to stand for two hours at 50° C. and after that time the polyurea was dissolved in methylene chloride. On distilling off, it remained behind as a viscous, slightly brown sirup with a nitrogen content of 4.77%. For the subsequent treatment, the polyureide was taken up in little methanol and the solution was mixed with one mol of formaldehyde per two g.-atoms of nitrogen and with a catalytic amount of phosphoric acid. By drying at room temperature, the batch which was immediately poured on a plane glass plate, yielded a still slightly adhesive clear oil skin. The film became practically free from stickiness by reheating it to 120° C. for 30 minutes. It was highly elastic and could easily and without damage be detached from the support.

*Example 6*

1 part of the ureido ester prepared from castor oil in the manner described in Example 1, and dissolved in ½ part of methanol was admixed with one mol of formaldehyde in a 40% aqueous solution, calculated on 2 g.-atoms of nitrogen in the ureide and then treated with 2 parts of cork powder until the solvent had practically evaporated. The mass obtained was made into a thin layer which was pressed for 10 minutes at a temperature of 120° C. on a jute-support between metal plates. After this operation, a highly elastic sheet of good mechanical resistance was obtained.

*Example 7*

28.14 parts of hydrogenated caster oil (iodine number 5, hydroxyl number about 150) and 8.91 parts of β-methyl-β-amino-butyrolactam were dissolved in 85 parts of dioxan and then mixed with the molar amount of hydrogen chloride, calculated on lactam, in dioxan. The mixture was allowed to stand overnight so that the amino acid chloride formed could react with the hardened castor oil. Then, the hydrochloride of the amino acid ester formed, dissolved in water/alcohol (60:40), was reacted at 50° C. with a concentrated aqueous solution of potassium cyanate (excess of 20%) to yield the trisureide. The ureido ester which precipitated at once, was taken up in methylene chloride, the solvent was evaporated, and the ester was dissolved in 15 times the quantity of alcohol, then mixed with one mole of formaldehyde, calculated on 1 g.-atom of nitrogen. After adding a catalytic amount of phosphoric acid, the solution was poured on to a plane glass plate. After drying overnight at room temperature the film practically was already free from stickiness and insoluble in solvents. The nearly colorless elastic film was after-hardened for 10 minutes at 130° C., and could be then easily detached from the support. When using the alcoholic solution for impregnating a fine taffeta-fabric made of polycaprolactam filaments a completely waterproof flexible oil skin was obtained, the other conditions being the same.

*Example 8*

A castor oil ureidoester (nitrogen content 5.3%) obtained as described in Example 4, was dissolved in 2 parts of aqueous 60% alcohol and then mixed with ½ mol of terephthaldialdehyde, calculated on 2 g.-atoms of nitrogen. A catalytic amount of phosphoric acid was added and the solution was poured on to a plane surface. After drying at 30–40° C., the product was after-hardened by heating it to 130° C. for 10 minutes. The clear, nearly colorless film showed similar properties as that obtained with formaldehyde in the manner described in Example 1.

*Example 9*

Castor oil was reacted as indicated in Example 1 with the amount of β-methyl-β-caprolactam, equivalent to β-methyl - β - aminobutyrolactam. With potassium cyanate (excess of 50%), the amino acid ester hydrochloride thus obtained was transformed at 50° C. into the ureido ester. In the course of the further reaction with formaldehyde (cf. Example 1) a clear, but very soft and still adhesive film was obtained. When replacing the castor oil by hydrogenated castor oil (hydroxyl number about 150), a film practically free from stickiness was formed.

*Example 10*

1 part of ureido ester, produced as described in Example 4, was dissolved in 1.5 parts of methanol together with 0.155 part of hexamethylolmelamine - pentamethylether and 0.03 part of concentrated phosphoric acid. The solution obtained was cast on to a plane surface. After evaporation of the methanol at room temperature, the product was heated to 140° C. for 30 minutes. A highly elastic, clear film, which was slightly adhesive and similar to the one obtained in Example 1 was formed. When replacing the castor oil by hydrogenated castor oil (iodine number 5) a product practically free from stickiness was obtained.

*Example 11*

Castor oil, calculated as ricinoleic acid-tri-glyceride and 3 mols of β-phenyl-propiolactam were dissolved in a small amount of dioxan. Then, 3 mols of hydrogen chloride were introduced at room temperature. The solvent was removed in vacuo at 40° C. The reaction product which remained was dissolved in 2 parts of methanol/water (1:1), and mixed with a concentrated solution of 4.5 mols of potassium cyanate, the tris-ureide precipitating at once as a viscous oil. The concentrated alcoholic solution of this tris-ureide was mixed with one mol of formaldehyde in a 40% aqueous solution, calculated on 2 g.-atoms of nitrogen, and then cast into a film. The film was allowed to stand overnight at 25° C., whereby a practically not adhesive, highly elastic, clear film of good tensile strength was obtained which was insoluble in the customary organic solvents.

The claims:

1. The method of making a film-forming polycondensation product which comprises reacting a member of the group consisting of aldehydes, α-chloroalkyl ethers, compounds having an N-methylol group, and compounds having an etherified N-methylol group, with a ureido-carboxylic acid ester of an hydroxy ester having at least two hydroxy groups on carbon atoms having hydrogen atoms also bound thereto and selected from the group consisting of esters of fatty acids and hydroxy-substituted fatty acids, said acids having a terminal hydrocarbon radical containing at least eight carbon atoms, said ureido-carboxylic acid ester having at least two primary amino groups.

2. The method of claim 1 wherein said hydroxy ester is a glyceride of an hydroxy-substituted fatty acid.

3. The method of claim 1 wherein said hydroxy ester is castor oil.

4. The method of claim 1 wherein said hydroxy ester is hydrogenated castor oil.

5. The process of claim 1, wherein the reaction is carried out in the presence of an acid.

6. The process of claim 1, wherein the reaction is carried out while heating and in the presence of an acid.

7. The process of claim 1, wherein a N-methylol compound of an amide is reacted.

8. The process of claim 1, wherein a N-methylol ether of an amide is reacted.

9. The process of claim 1, wherein a N-methylol compound of a linear polyamide is reacted.

10. The process of claim 1, wherein a N-methylol ether of a linear amide is reacted.

11. The process of claim 1, wherein the reaction is carried out on an absorptive substratum.

12. The products obtained by the process claimed in claim 1.

13. The process of claim 1, wherein the ureido-carboxylic acid ester is an ester of a β-ureido-carboxylic acid.

14. The process of claim 13, wherein the ureido group of the β-ureido-carboxylic acid ester is bound to a tertiary carbon atom.

References Cited by the Examiner

UNITED STATES PATENTS

| | | | |
|---|---|---|---|
| 2,616,874 | 11/52 | Yost et al. | 260—69 |
| 2,689,844 | 9/54 | Melamed | 260—69 |
| 2,734,891 | 2/56 | Melamed et al. | 260—69 |
| 2,983,593 | 5/61 | Duke | 260—69 |
| 3,018,265 | 1/62 | Tessmar | 260—70 |

FOREIGN PATENTS 537,827   3/57   Canada.

LEON J. BERCOVITZ, *Primary Examiner.*

A. D. SULLIVAN, MILTON STERMAN, *Examiners.*